United States Patent
Wu et al.

(10) Patent No.: US 11,244,212 B2
(45) Date of Patent: Feb. 8, 2022

(54) PRINTING WHITE FEATURES OF AN IMAGE USING A PRINT DEVICE

(71) Applicant: Idemia Identity & Security USA LLC, Billerica, MA (US)

(72) Inventors: Yecheng Wu, Lexington, MA (US); Brian K. Martin, McMurray, PA (US)

(*) Notice: Subject to any disclaimer, the term of this patent is extended or adjusted under 35 U.S.C. 154(b) by 69 days.

(21) Appl. No.: 16/236,957

(22) Filed: Dec. 31, 2018

(65) Prior Publication Data

US 2019/0205710 A1 Jul. 4, 2019

Related U.S. Application Data

(60) Provisional application No. 62/612,353, filed on Dec. 30, 2017.

(51) Int. Cl.
*G06K 9/40* (2006.01)
*G06K 15/12* (2006.01)
(Continued)

(52) U.S. Cl.
CPC .......... *G06K 15/128* (2013.01); *C09D 11/322* (2013.01); *G06K 9/2054* (2013.01);
(Continued)

(58) Field of Classification Search
CPC .......... G06K 9/20; G06K 9/2054; G06K 9/36; G06K 9/38; G06K 15/128; G06K 15/1872; G06K 15/1878; G06K 15/188; G06T 5/001; G06T 5/007; G06T 5/008; G06T 5/009; G06T 7/10; G06T 7/194; G06T 7/90; G06T 11/001; H04N 1/387; H04N 1/3872;
(Continued)

(56) References Cited

U.S. PATENT DOCUMENTS

| | | | |
|---|---|---|---|
| 6,731,800 B1 * | 5/2004 | Barthel | H04N 1/41 382/176 |
| 7,424,148 B2 * | 9/2008 | Goh | G06T 5/009 382/169 |

(Continued)

OTHER PUBLICATIONS

International Search Report and Written Opinion in International Application No. PCT/US2018/068188, dated Apr. 15, 2019, 10 pages.
(Continued)

*Primary Examiner* — Eric Rush

(74) *Attorney, Agent, or Firm* — Robert Facey

(57) ABSTRACT

Methods, systems, and apparatus, including computer programs encoded on a computer storage medium, for generating, based on a portrait image, a foreground image mask to indicate foreground pixels of the portrait image; identifying a percentage of white or near white pixels in the foreground by using the foreground image mask and pixel colors in the portrait image; determining whether the percentage of white or near white pixels in the foreground is larger than a predefined threshold; in response to determining, triggering identification of edge pixels in a background of the portrait image; adjusting white background pixels to add shadows by darkening the white background pixels; and adjusting the white or near white pixels in the foreground by darkening the white or near white pixels.

20 Claims, 3 Drawing Sheets

(51) Int. Cl.
    *C09D 11/322*     (2014.01)
    *G06K 15/02*     (2006.01)
    *H04N 1/60*     (2006.01)
    *G06T 5/00*     (2006.01)
    *G06T 7/194*     (2017.01)
    *G06K 9/20*     (2006.01)
    *H04N 1/62*     (2006.01)
    *G06K 9/38*     (2006.01)
    *H04N 1/387*     (2006.01)

(52) U.S. Cl.
    CPC ............. *G06K 9/38* (2013.01); *G06K 15/188* (2013.01); *G06K 15/1878* (2013.01); *G06T 5/008* (2013.01); *G06T 5/009* (2013.01); *G06T 7/194* (2017.01); *H04N 1/6027* (2013.01); *H04N 1/62* (2013.01); *H04N 1/3872* (2013.01); *H04N 1/3873* (2013.01)

(58) Field of Classification Search
    CPC .... H04N 1/3873; H04N 1/407; H04N 1/4072; H04N 1/60; H04N 1/6027; H04N 1/6058; H04N 1/6063; H04N 1/62; C09D 11/322
    USPC ........ 382/100, 112, 115, 117, 118, 162, 167, 382/254, 274, 282, 283; 345/426, 589; 358/2.1, 447, 448, 461, 464, 515–518, 358/520, 530, 531
    See application file for complete search history.

(56) References Cited

U.S. PATENT DOCUMENTS

| | | | | |
|---|---|---|---|---|
| 7,602,529 B2* | 10/2009 | Foster | .................. | H04N 1/4092 382/100 |
| 9,019,407 B2* | 4/2015 | Ikeda | ..................... | H04N 9/69 348/254 |
| 2003/0048461 A1* | 3/2003 | Larson | .................. | H04N 1/407 382/274 |
| 2003/0086018 A1 | 5/2003 | Berman et al. | | |
| 2005/0219583 A1* | 10/2005 | Foster | .................... | G06K 15/12 358/1.9 |
| 2005/0280875 A1* | 12/2005 | Noel | ..................... | G06K 15/02 358/3.13 |
| 2006/0233452 A1* | 10/2006 | Yang | ....................... | G06K 9/38 382/254 |
| 2007/0177050 A1* | 8/2007 | Xiao | ...................... | G06T 5/008 348/371 |
| 2008/0285853 A1* | 11/2008 | Bressan | ................. | G06T 5/009 382/169 |
| 2009/0268973 A1 | 10/2009 | Majewicz | | |
| 2010/0302272 A1* | 12/2010 | Reid | ................. | G06K 9/00234 382/254 |
| 2011/0268320 A1 | 11/2011 | Huang et al. | | |
| 2011/0311134 A1 | 12/2011 | Wilensky | | |
| 2013/0329998 A1* | 12/2013 | Webb | ..................... | G06T 5/007 382/167 |
| 2016/0156805 A1* | 6/2016 | Reed | ..................... | H04N 1/6005 382/100 |
| 2018/0130188 A1* | 5/2018 | Farrell | ..................... | G06T 7/90 |

OTHER PUBLICATIONS

PCT International Preliminary Report on Patentability and Written Opinion in International Application No. PCT/US2018/068188, dated Jun. 30, 2020, 6 pages.

* cited by examiner

PRINTING WHITE FEATURES OF AN IMAGE USING A PRINT DEVICE

FIELD

This specification relates to improved printing of white image content.

BACKGROUND

User identifications such as driver licenses can be issued either as physical identification cards or digital identifications. A physical identification card is issued by creating a card that includes customer or cardholder information, whereas a digital identification is issued in an electronic format and accessed using a client device. Both physical and digital identifications are commonly used for verifying the identity of an individual, providing access to restricted areas, or authorizing an individual to purchase age-restricted content.

Mobile computing devices such as smartphones and tablets can be used to capture digital images and video content of an identification card or document. The captured image or video content may be used to validate the authenticity of the card. Authenticity checks may require that relevant information on the identification be photographed with minimal glare, shadows, or other obscurities that can distort representations depicted in the captured image content.

SUMMARY

This specification describes techniques for improving white color printing on cyan, magenta, yellow, and black (CMYK) printing devices. Portrait images for an identification document are often printed using a CMYK printer. A CMYK printer normally does not have a white ribbon or ink cartridge. Because of this, white color in a portrait image is treated (by the printing device) as transparent and rendered with a white backdrop. Because of this, characteristics such as white clothing or white hair may disappear when the image background or backdrop is also white. Hence, this document describes methods for improving a printing quality of a portrait image where large portions of white clothing and/or white hairs are present in the image.

One aspect of the subject matter described in this specification can be embodied in a computer-implemented method. The method includes generating, for a portrait image, a foreground image mask to indicate pixels in a foreground of the portrait image; identifying a percentage of white pixels in the foreground based on the foreground image mask and pixel colors in the portrait image; and determining that the percentage of white pixels in the foreground exceeds a predefined threshold. In response to determining that the percentage of white pixels in the foreground exceeds the predefined threshold, the method further includes triggering identification of edge pixels in a background of the portrait image; adjusting white background pixels to add shadows by darkening the white background pixels; and adjusting the white pixels in the foreground by darkening the white pixels.

These and other implementations can each optionally include one or more of the following features. For example, in some implementations, adjusting the white background pixels includes adjusting white pixels of a background of the image to add respective shadow features to one or more background portions of the image. In some implementations, the respective shadow features are added in response to darkening a respective subset of the white pixels at each of the one or more background portions of the image.

In some implementations, identifying the percentage of white pixels in the foreground includes identifying a percentage of substantially white pixels in the foreground, based on the foreground image mask and pixel colors in the portrait image; or identifying a percentage of near white pixels in the foreground, based on the foreground image mask and pixel colors in the portrait image. In some implementations, generating the foreground image mask includes generating a data structure that indicates respective values for a set of image mask parameters that are used to identify the foreground of the image.

In some implementations, the set of image mask parameters indicate pixels that are associated with the foreground of the portrait image and pixels that are associated with the background of the portrait image. In some implementations, respective values for the set of image mask parameters indicated by the data structure includes a first binary value indicating a foreground pixel to identify the foreground of the image; and a second binary value indicating a background pixel to identify the background of the image.

Other implementations of this and other aspects include corresponding systems, apparatus, and computer programs, configured to perform the actions of the methods, encoded on computer storage devices (e.g., non-transitory machine-readable storage devices). A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented to realize one or more of the following advantages. The described processes can be used to improve the printing quality of a portrait image where large portions of white clothing and white hairs are present.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for improving white color printing on cyan, magenta, yellow, and black (CMYK) printing devices. Portrait images for an identification document are often printed using a CMYK printer. A CMYK printer normally does not have a white ribbon or ink cartridge. Because of this, white color in a portrait image is treated as transparent and rendered with a white backdrop.

When a portrait image is printed using a CMYK printer, white clothing or white hair in the image may disappear when the image background or backdrop is also white. Hence, this document describes methods for improving a printing quality of a portrait image where large portions of white clothing and/or white hairs are present in the image.

Figure 1:
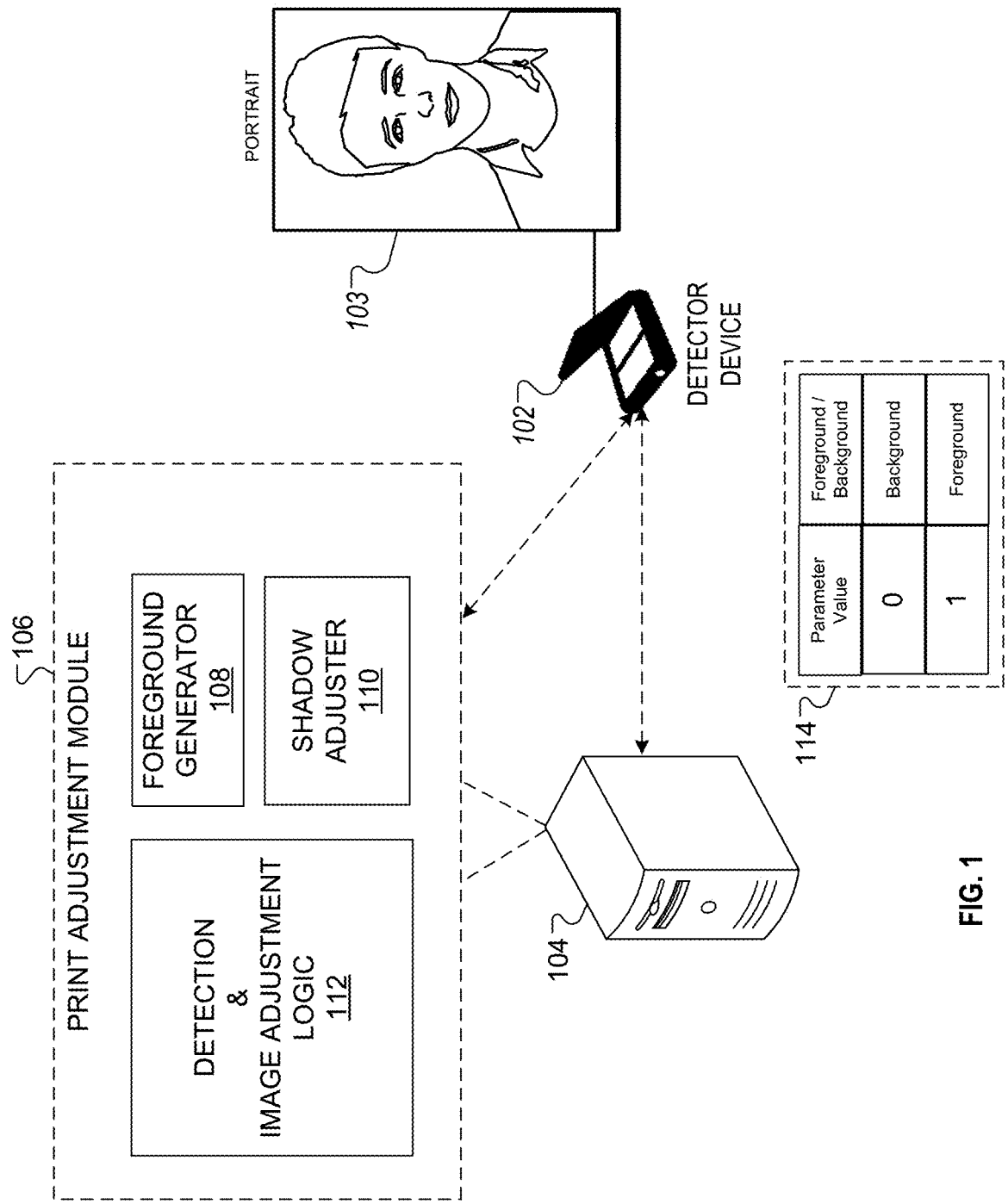
FIG. 1 shows a block diagram of a computing system for improving white color printing.

FIG. 1 shows a block diagram of a computing system 100 for improving white color printing, e.g., on a CMYK printer. System 100 generally includes detection device 102 and computing server 104. Device 102 can be a computing device that includes a camera application, an image data processor, or other related computing features for reading and analyzing image data for a portrait image 103. Device 102 is configured to exchange data communications with server 104 to process image pixel data for portrait 103.

In general, server 104 executes programmed instructions for improving white color printing of portrait 103 on cyan, magenta, yellow, and black (CMYK) printing devices based on analysis of image data for portrait 103. In some implementations, the described techniques implemented by server 104 can used to improve white color (or other color) printing on variety of other types of printing devices (e.g., inkjet printers that use other color models).

As described in more detail below, server 104 includes a print adjustment module 106 that includes multiple computing features. Each computing feature of module 106 corresponds to programmed code/software instructions for executing processes and techniques for improving white color printing and various print devices. While in typical implementations, computing features of server 104 are encoded on computer-readable media, in some implementations, these computing features are included within module 106 as a sub-system of hardware circuits that include one or more processing devices or processor microchips.

In general, module 106 can include processors, memory, and data storage devices that collectively form modules and computer systems of the module. Processors of the computer systems process instructions for execution by module 106, including instructions stored in the memory or on the data storage device to display graphical information for output at an example display monitor of system 100. Execution of the stored instructions can cause one or more of the actions described herein to be performed by module 106. In other implementations, multiple processors may be used, as appropriate, along with multiple memories and types of memory.

As used in this specification, and with reference to module 106, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

Module 106 generally includes foreground generator 108, shadow adjuster 110, and detection & adjustment logic 112. In general, computing features of module 106 are used to automatically improve white color printing of portrait 103 on CMYK and various other printing devices based on analysis of image pixel data for portrait 103. As noted above, portrait 103 can be used to generate an identification document that can be printed using a CMYK printer. Because CMYK printers normally do not have a white ribbon or ink cartridge, depictions of white color, substantially white color, or near white color, in a portrait image is treated as transparent and rendered with a white backdrop. Due to the white backdrop, white clothing or white hair may disappear when the image background or backdrop is also white.

In this manner, techniques are described for improving a printing quality of a portrait image where large portions of white clothing and/or white hairs are present in the image. More specifically, this specification describes methods to improve the printing quality of a portrait image 103 with a white backdrop where large portions of white clothing and white hairs are present in the portrait. As described in more detail below, portrait image 103 is modified by adding shadows on edges and darkened white pixels on the subject before image pixel data for the portrait 103 is provided to a CMYK printer, or other type of print device.

In some implementations, portrait images for an identification document may be printed using a CMYK printer. As noted above, for a CMYK printer, white color or near white color in a portrait image may be treated as transparent and rendered with a white backdrop. To mitigate this occurrence, the described techniques can be implemented using one or more of the following processes. For a color portrait image 103 having white backdrop, module 106 uses foreground generator 108 to generate a foreground image mask. For example, image data for portrait 103 can indicate that the portrait includes a foreground and a background. Generator 108 can analyze image pixel data associated with a foreground portion of portrait 103 and generate the foreground image mask based on the analysis.

The foreground image mask includes pixel color information and is configured to indicate foreground pixels of portrait 103. For example, foreground generator 108 can set an image mask parameter value to binary 1 if a pixel is determined to be part of the foreground of portrait 103 and can set an image mask parameter value to binary 0 if a pixel is determined to be part of the background of portrait 103. In some implementations, module 106 uses foreground generator 108 to create an example data structure 114 that indicates various values for the image mask parameters.

Module 106 is configured to identify the percentage of white, substantially white, or near white pixels in the foreground of portrait 103. For example, module 106 can use detection and adjustment logic 112 to analyze pixel information included in the foreground image mask and pixel color data included in the portrait image. In some implementations, logic 112 is used to identify white, substantially white, or near white pixels based on a respective color value of the pixels.

For example, a white pixel may have a first numerical color value (e.g., 0.34), while a substantially white pixel may have a second different numerical color value (e.g., 0.37) that is within a particular numerical range of the first numerical color value (e.g., a range of 0.3). Similarly, a near white pixel may have a third different numerical color value (e.g., 0.41) that is within a particular numerical range of the first numerical color value (e.g., 0.7). In this manner, substantially white and near white pixels can be identified in response to logic 112 determining that a particular pixel color value is within a particular range of the white pixel color.

Module 106 is configured to use detection logic 112 to make determinations about pixel percentages relative to certain predefined thresholds. Module 106 can determine whether the percentage of white or near white pixels in the foreground of portrait 103 is larger than or exceeds a predefined threshold. When module 106 determines that the percentage of white (or near white) pixels exceeds, or is larger than, the predefined threshold, system 100 triggers additional image processing steps to improve a print or printing quality of a portrait image.

The processing steps are used to improve the print quality when large portions of, for example, white clothing and/or white hairs are present in the image. For example, module 106 uses logic 112 to identify edge pixels in the background of portrait 103. In response to identifying the edge pixels in the background, module 106 uses shadow adjuster 110 to add shadows or other dark features to the identified edge pixels.

For example, shadow adjuster 110 can add shadow features to the edge pixels by darkening the white background pixels so that the white background pixels are adjusted to gray or another desired color. In some implementations, for white, substantially white, or near white pixels in the foreground, module 106 uses shadow adjuster 110 to darken these pixels by changing the pixel color to gray or another suitable color such that image features (e.g., white hair or clothing) that are associated with these pixels are discernable when printed on a CMYK printer.

Figure 2:
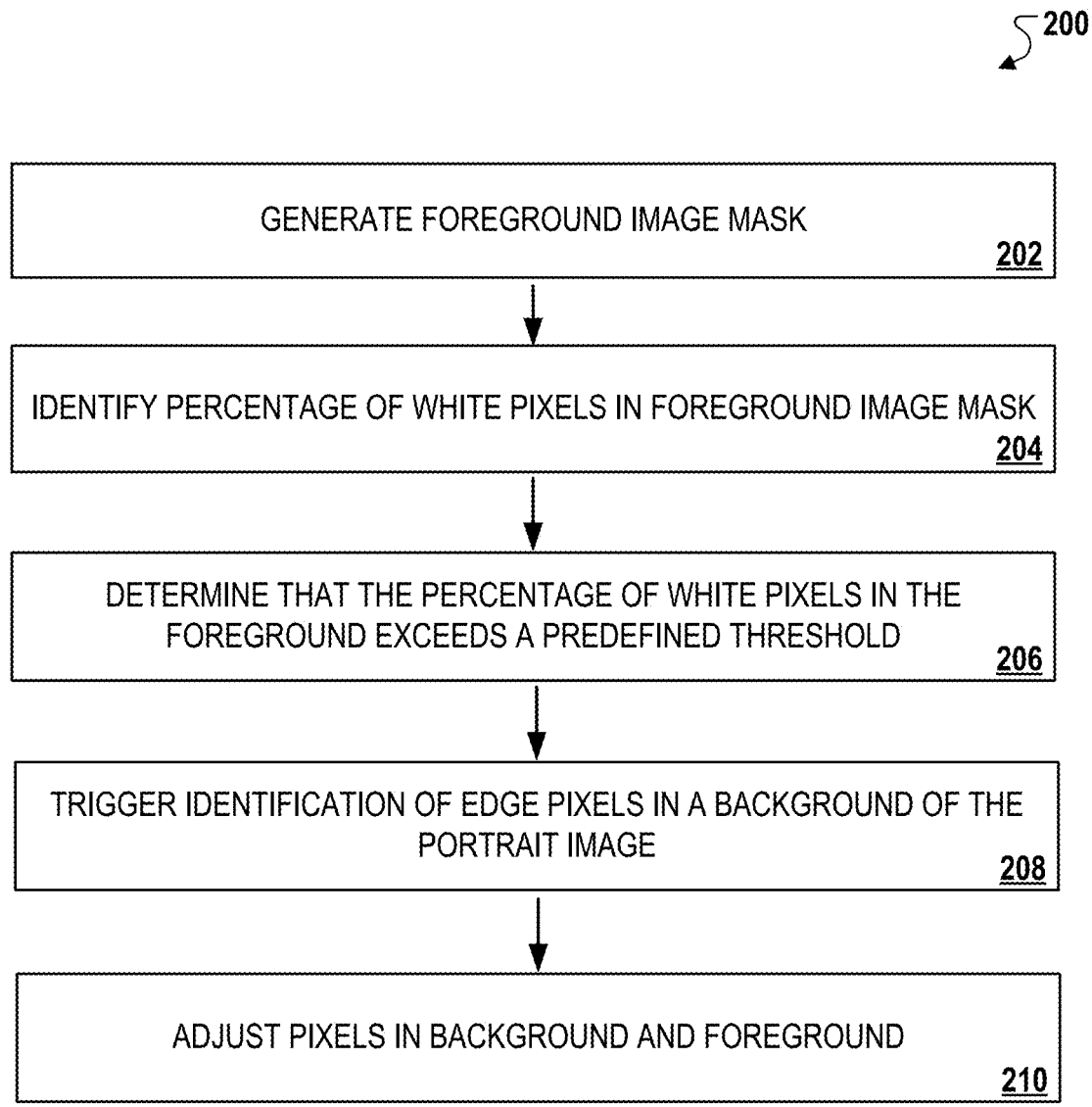
FIG. 2 shows a flow diagram of an example process for improving white color printing.

FIG. 2 shows a flow diagram of an example process for improving white color printing. Process 200 can be implemented or executed using the systems and devices described above. In some implementations, the described actions of process 200 are enabled by computing logic or programmed instructions executable by processing devices and memory of computing resources described in this document.

At block 202 of process 200, using a color portrait image that has a white backdrop, system 100 generates a foreground image mask to indicate foreground pixels of the portrait image. For example, system 100 can set a first parameter value to 1 if a pixel is part of the foreground. Similarly, system 100 can set a second parameter value to 0 if the pixel is part of the background. In some implementations, generating the foreground image mask includes module 106 using foreground generator 108 to generate a data structure 114 that indicates respective values for a set of image mask parameters. The image mask parameters are used to identify the foreground of the image to generate the foreground image mask.

At block 204, system 100 identifies the percentage of white pixels in the foreground based on, or using, the foreground image mask and pixel color in the portrait image. For example, to identify the percentage of white pixels in the foreground, module 106 can analyze a quantity of parameter values (e.g., parameter values of 1) in the data structure 114 that indicate pixels that are associated with the foreground of the image. The module 106 can compare the parameter values indicating pixels that are associated with the foreground of the image to the overall pixel color values in the portrait image. The module 106 can identify the percentage of white pixels in the foreground based on the outcome of this comparison.

In some implementations, identifying the percentage of white pixels in the foreground includes identifying at least one of: i) a percentage of substantially white pixels in the foreground, based on the foreground image mask and pixel colors in the portrait image or ii) identifying a percentage of near white pixels in the foreground, based on the foreground image mask and pixel colors in the portrait image.

At block 206, system 100 determines whether a percentage of white pixels in the foreground exceeds a predefined threshold. If the percentage of white (or near white) pixels is greater than a certain threshold percentage, system 100 triggers additional processing to identify the edge pixels in the background. Hence, at block 208, in response to determining that the percentage of white pixels in the foreground exceeds the predefined threshold percentage, the process 200 includes triggering identification of edge pixels in a background of the portrait image.

At block 210, the process 200 includes adjusting white background pixels to add shadows by darkening the white background pixels and adjusting the white pixels in the foreground by darkening the white pixels. In some examples, for white pixels, substantially white pixels, or near white pixels in the foreground, system 100 uses logic 110 and shadow adjuster 110 to adjust a color feature of these pixels, e.g., by darkening the pixels. In some implementations, module 106 adjusts the color feature or darkens the pixels by changing the pixel colors to gray so they (pixels of portrait 103) are printable on the CMYK printer.

Module 106 is operable to add shadows to edge pixels by darkening the white background pixels to make them gray or any color needed. In this manner, adjusting the variations of white background pixels can include adjusting white pixels of a background of the image to add respective shadow features to one or more background portions of the image. In some implementations, the respective shadow features are added in response to darkening a respective subset of the white pixels at each of the one or more background portions of the image.

Figure 3:
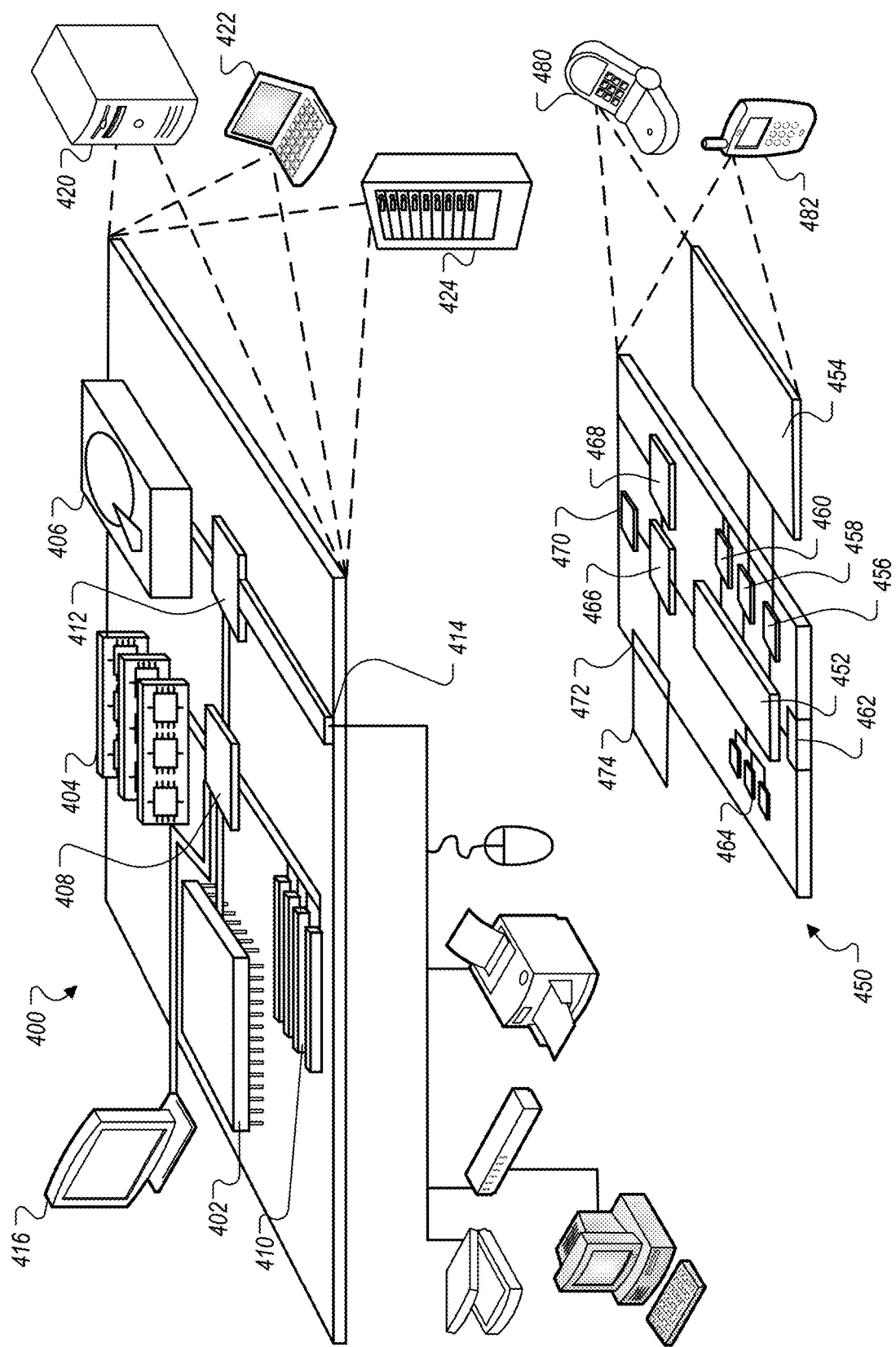
FIG. 3 shows a block diagram of a computing system that can be used in connection with computer-implemented methods described in this specification.

FIG. 3 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450.

Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480.

It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As discussed above, systems and techniques described herein can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   generating, based on a "0" or "1" integer value, a foreground image mask after processing respective binary integer values for each of a plurality of image mask parameters that represent a foreground of a portrait image;

identifying a plurality of white pixels in the foreground from discrete numerical pixel values of the foreground image mask that represent white pixels in image data for the portrait image;

determining, based on the discrete numerical pixel values of the foreground image mask, that a percentage of white pixels in the foreground exceeds a predefined threshold relative to pixels in the image data that represents a background of portrait image;

when the percentage of white pixels in the foreground exceeds the predefined threshold, adding a shadow feature to the portrait image by adjusting a respective color of edge pixels in the image data that correspond to the background;

generating a contrast between the background and the foreground of the portrait image based on the shadow feature added to the portrait image; and adjusting the plurality of white pixels in the foreground at least by darkening each of the plurality of white pixels in the foreground.

2. The method of claim 1, wherein adding the shadow feature comprises:

adjusting white pixels of the background of the portrait image to add respective shadow features to one or more background portions of the portrait image.

3. The method of claim 2, wherein the respective shadow features are added in response to darkening a respective subset of white pixels at each of the one or more background portions of the portrait image.

4. The method of claim 1, wherein identifying the plurality of white pixels in the foreground comprises:

identifying a percentage of substantially white pixels in the foreground, based on the foreground image mask and pixel colors in the portrait image; or identifying a percentage of near white pixels in the foreground, based on the foreground image mask and pixel colors in the portrait image.

5. The method of claim 1, wherein generating the foreground image mask comprises:

generating a data structure that indicates respective values for a set of image mask parameters that are used to identify the foreground of the portrait image.

6. The method of claim 5, wherein the set of image mask parameters indicate pixels that are associated with the foreground of the portrait image and pixels that are associated with the background of the portrait image.

7. The method of claim 6, wherein respective values for the set of image mask parameters indicated by the data structure comprises:

a first binary value indicating a foreground pixel to identify the foreground of the portrait image; and a second binary value indicating a background pixel to identify the background of the portrait image.

8. A system, comprising:

one or more processing devices; and one or more non-transitory machine-readable storage devices storing instructions that are executable by the one or more processing devices to cause performance of operations comprising:

generating, based on a "0" or "1" integer value, a foreground image mask after processing respective binary integer values for each of a plurality of image mask parameters that represent a foreground of portrait image;

identifying a plurality of white pixels in the foreground from discrete numerical pixel values of the foreground image mask that represent white pixels in image data for the portrait image;

determining, based on the discrete numerical pixel values of the foreground image mask, that a percentage of white pixels in the foreground exceeds a predefined threshold relative to pixels in the image data that represent a background of the portrait image;

when the percentage of white pixels in the foreground exceeds the predefined threshold, adding a shadow feature to the portrait image by adjusting a respective color of edge pixels in the image data that correspond to the background;

generating a contrast between the background and the foreground of the portrait image based on the shadow feature added to the portrait image, and adjusting the plurality of white pixels in the foreground at least by darkening each of the plurality of white pixels in the foreground.

9. The system of claim 8, wherein adding the shadow feature comprises:

adjusting white pixels of the background of the portrait image to add respective shadow features to one or more background portions of the portrait image.

10. The system of claim 9, wherein the respective shadow features are added in response to darkening a respective subset of white pixels at each of the one or more background portions of the portrait image.

11. The system of claim 8, wherein identifying the plurality of white pixels in the foreground comprises:

identifying a percentage of substantially white pixels in the foreground, based on the foreground image mask and pixel colors in the portrait image; or identifying a percentage of near white pixels in the foreground, based on the foreground image mask and pixel colors in the portrait image.

12. The system of claim 8, wherein generating the foreground image mask comprises:

generating a data structure that indicates respective values for a set of image mask parameters that are used to identify the foreground of the portrait image.

13. The system of claim 12, wherein the set of image mask parameters indicate pixels that are associated with the foreground of the portrait image and pixels that are associated with the background of the portrait image.

14. The system of claim 13, wherein respective values for the set of image mask parameters indicated by the data structure comprises:

a first binary value indicating a foreground pixel to identify the foreground of the portrait image; and a second binary value indicating a background pixel to identify the background of the portrait image.

15. One or more non-transitory machine-readable storage devices storing instructions that are executable by one or more processing devices to cause performance of operations comprising:

generating based on a "0" or "1" integer value, a foreground image mask after processing respective binary integer values for each of a plurality of image mask parameters that represent a foreground of a portrait image;

identifying a plurality of white pixels in the foreground from discrete numerical pixel values of the foreground image mask that represent white pixels in image data for the portrait image;

determining, based on the discrete numerical pixel values of the foreground image mask, that a percentage of white pixels in the foreground exceeds a predefined threshold relative to pixels in the image data that represent a background of the portrait image;

when the percentage of white pixels in the foreground exceeds the predefined threshold, adding a shadow feature to the portrait image by adjusting a respective color of edge pixels in the image data that corresponds to the background;

generating a contrast between the background and the foreground of the portrait image based on the shadow feature added to the portrait image; and adjusting the plurality of white pixels in the foreground at least by darkening each of the plurality of white pixels in the foreground.

16. The one or more non-transitory machine-readable storage devices of claim 15, wherein adding the shadow feature comprises:

adjusting white pixels of the background of the portrait image to add respective shadow features to one or more background portions of the portrait image.

17. The one or more non-transitory machine-readable storage devices of claim 16, wherein the respective shadow features are added in response to darkening a respective subset of white pixels at each of the one or more background portions of the portrait image.

18. The one or more non-transitory machine-readable storage devices of claim 15, wherein identifying the plurality of white pixels in the foreground comprises:

identifying a percentage of substantially white pixels in the foreground, based on the foreground image mask and pixel colors in the portrait image; or identifying a percentage of near white pixels in the foreground, based on the foreground image mask and pixel colors in the portrait image.

19. The one or more non-transitory machine-readable storage devices of claim 15, wherein generating the foreground image mask comprises:

generating a data structure that indicates respective values for a set of image mask parameters that are used to identify the foreground of the portrait image, wherein the set of image mask parameters indicate pixels that are associated with the foreground of the portrait image and pixels that are associated with the background of the portrait image.

20. The one or more non-transitory machine-readable storage devices of claim 19, wherein respective values for the set of image mask parameters indicated by the data structure comprises:

a first binary value indicating a foreground pixel to identify the foreground of the portrait image; and a second binary value indicating a background pixel to identify the background of the portrait image.

* * * * *